Feb. 8, 1949.  R. F. MOULTON  2,461,073
MECHANISM APPLICABLE TO ROTARY PUMPS, MOTORS, ETC.
Filed Aug. 30, 1943  2 Sheets-Sheet 1
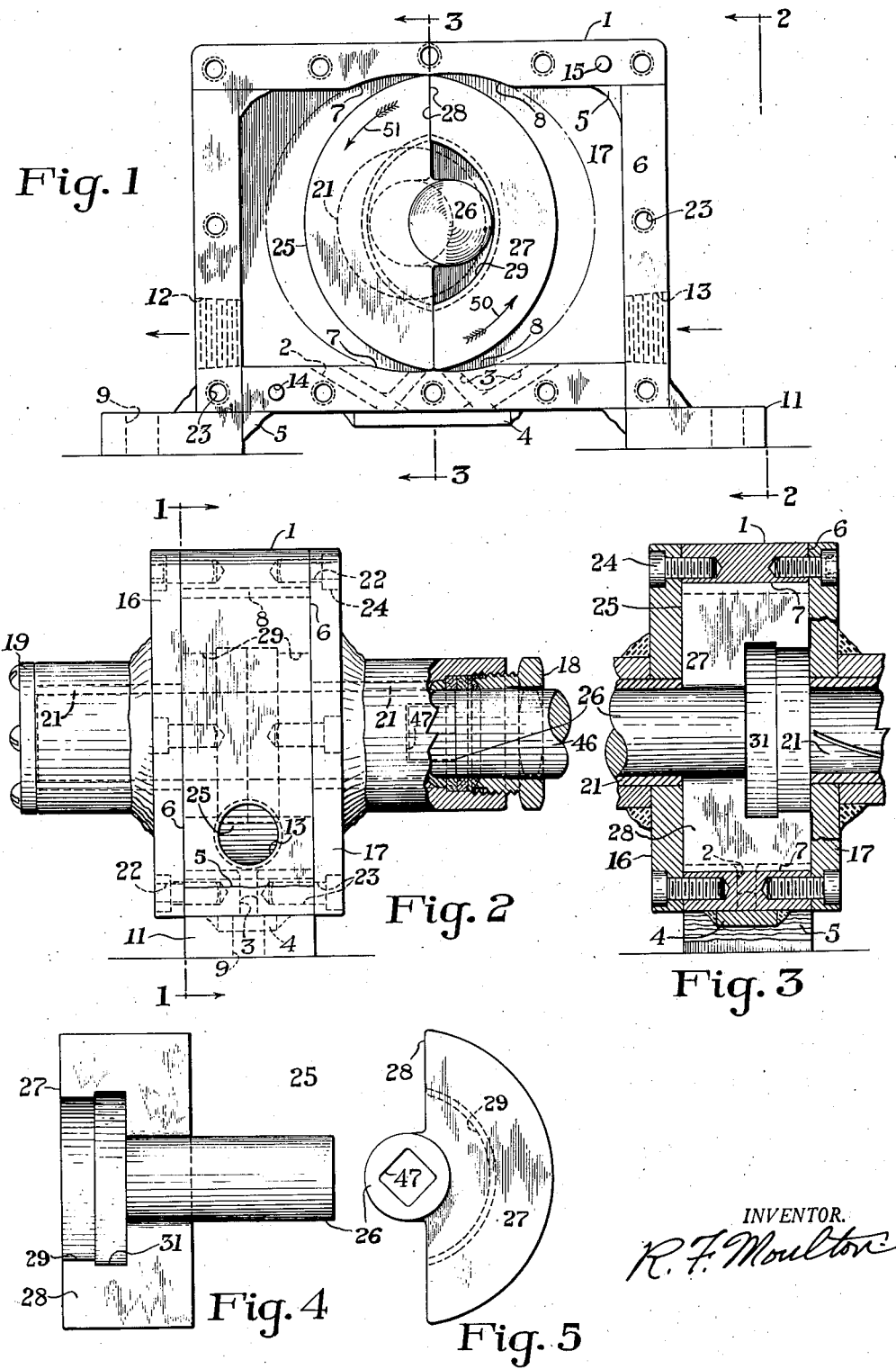

Feb. 8, 1949.   R. F. MOULTON   2,461,073
MECHANISM APPLICABLE TO ROTARY PUMPS, MOTORS, ETC.
Filed Aug. 30, 1943   2 Sheets-Sheet 2

INVENTOR.
R. F. Moulton

Patented Feb. 8, 1949

2,461,073

UNITED STATES PATENT OFFICE 2,461,073

MECHANISM APPLICABLE TO ROTARY PUMPS, MOTORS, ETC.

Reginald F. Moulton, Canton, Ohio

Application August 30, 1943, Serial No. 500,501

10 Claims. (Cl. 103—129)

The invention relates broadly to a mechanism or machine of novel design and arrangement which can be advantageously adapted for use as a rotary pump, or fluid driven motor, or as an air or other gas compressor, or as a blower, or as an engine, or as a coupling for rotating shafts, or as a rotary valve, or as a double acting cam in connection with other mechanism, or as a mechanism applicable to any other suitable purpose.

More particularly, I have chosen to set forth the invention as a mechanism relating to rotary pumps and/or fluid motors, for I have found by actual experiment that the invention is useful, workable, and valuable when applied to a machine of such classification or classifications.

It is an object of the present invention to provide a new and useful mechanism. Another object is to provide a new and useful fluid pump or fluid driven motor. A further object of the invention is to provide a rotary pump with the least amount of mechanical friction and resulting wear on the parts by comparison with any other pump in its classification now on the market. A still further object of the invention is to provide a positive displacement rotary pump with only two main parts to manufacture. Still another object is to provide a rotary pump for fluids wherein the pump capacity, for pumping pressures not exceeding approximately ten pounds per square inch, shows a volumetric efficiency exceeding one-hundred percent by resorting to novel volute buckets in the rotor elements; these buckets also have novel operational features and arrangement. Additional objects of the invention may be listed as providing a pump capable of operating at comparatively high speeds so as to afford what appears to be a continuous discharge; a pump which can operate at comparatively high pressures; a pump which can be made in the usual run of machine shops; a pump with universal characteristics, that is, it can be adapted to the user's particular installation conditions without design alterations, and it can be operated in either rotational direction, and it can be driven from either side in either direction, and it can be mounted upon suitable brackets at any angle and in any orientation desired. Other objects and advantages of the invention will appear upon reading the following description and claims, and upon considering in connection therewith the attached drawings to which they relate.

I attain these objects by mechanism illustrated in the accompanying drawings, in which:

Figure 1 is a side view drawing of a mechanism according to the invention which has been constructed and operated and which shows one side cover or enclosure removed;

Fig. 2 is an end view looking in the direction of arrows 2—2 of Fig. 1;

Fig. 3 is a transverse section on the line 3—3 of Fig. 1, with the near rotor element removed and with the right central portion broken away to show bearing structure in part;

Figures 4 and 5 show projections of one type of rotor element or sector piston;

Figure 7:
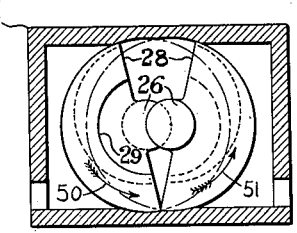
Figure 8:
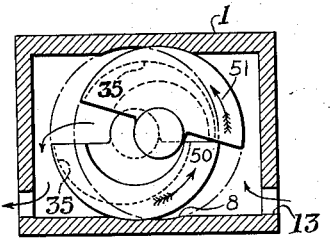
Figure 9:
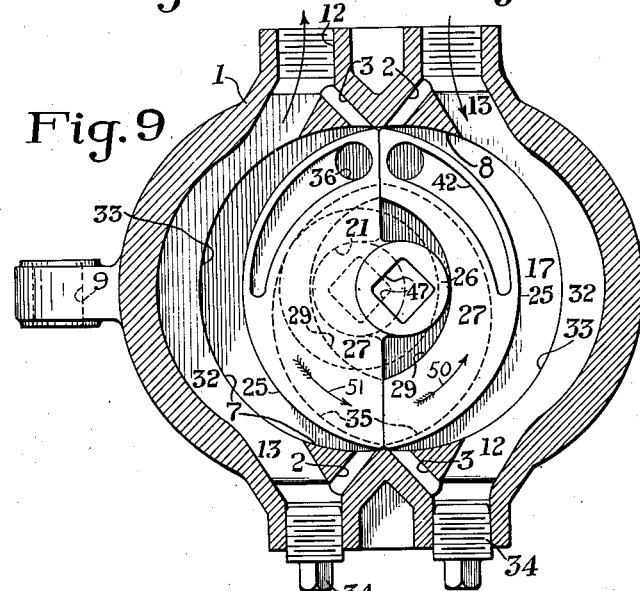
Figure 10:
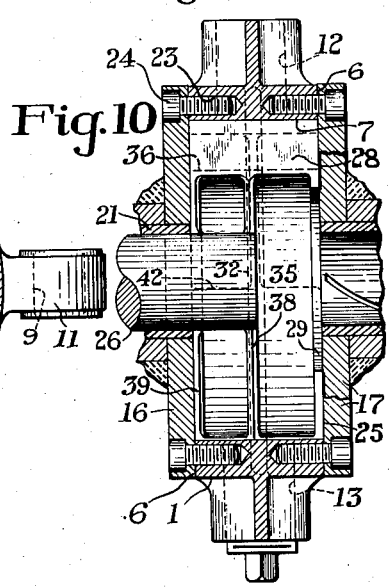
Figure 11:
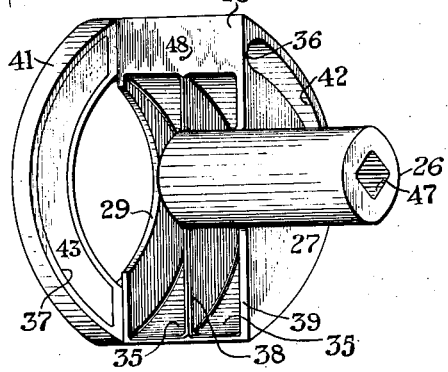

Fig. 9, which is a different embodiment than that shown in Figures 1 to 8 inclusive, is a side view of a pump according to the invention with the cast type casing shell sectioned and with the sector pistons shown in full;

Fig. 10 is a transverse section relating to Fig. 9, as Fig. 3 relates to Fig. 1;

Fig. 11 is a pictorial view of another type of sector piston; and

Figure 12:
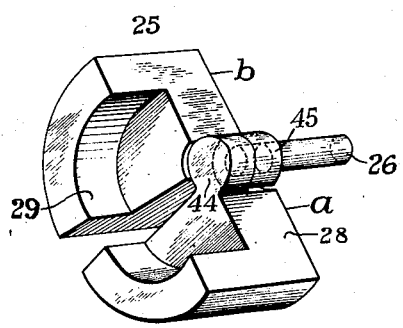

Fig. 12 is a perspective view showing still another sector piston or pistons applicable to the invention as hereinafter set forth or described.

There are several kinds or types of pump now on the market. Aside from pumps designed for specific reasons, each pump of any type is usually designed to resolve as many pumping problems as possible. There are such pumps as the gear pump, the reciprocating piston in a cylinder type, the centrifugal pump, the rotary sliding vane or swinging bucket types, various screw type designs, etc.

It may be stated that conventional pumps have certain advantages, but each conventional type has certain disadvantages or limitations. The limiting factor might be the cost in one type, speed limitations in another, or pressure limitations; practicable capacity limitations, excessive wear and maintenance costs, low efficiency, difficulty of forming and machining, intermittent discharge, low efficiency with speed variation; excessive vibration, weightiness or bulkiness per unit capacity, non-reversing character, too many parts to make and assemble and maintain, installation and connection limitations, or some other limiting factor or factors inherent in the design.

Now, an ideal pump would not have one or more limiting factors mentioned above. While I do not claim the present invention provides an ideal pump or motor, tests conducted so far have disclosed only one limiting factor which will be cited under operation.

Turning again to the drawings, in which like reference characters refer to like or similar parts thruout, I may be considered as a casing ring which may be open at one or both lateral sides. Casing ring I can be rough formed by welding together suitable lengths of stock metal plate as in Fig. 1, or I may be cast metal, or other suitable material, as in Fig. 9.

The pump or motor illustrated in Figures 1 to 5 inclusive was made without recourse to patterns or dies, the material mainly consisting of metal plate stock and round bar stock.

In the first three figures, casing ring I was made by first shear cutting the plate pieces to approximate size. Next, the apertures 2 and 3 in one or both of the top and bottom plates are spotted and drilled. Plate as at 4 is then welded on as indicated to eventually close off the apertures 2 and 3 from the outside. After clamping the pieces, welds as at 5 are made, the top welds first. After normalizing welding strains by heat treatment, a straddle milling operation forms parallel side surfaces 6. Cylindrical bores, or more exactly, arcuate bores are then formed by boring, or as in the present instance, by drill press operations. Bores 7 and 8 may be a cylindrical sector or sectors as in Fig. 1, or they may be semi-circular as in Fig. 9. It will be seen that bores 7 and 8 are offset so as to overlap and intersect each other eccentrically, and I usually position the centers of the bores apart about ⅛ to ⅙ of the diameter of the bores themselves.

Next, attachment holes 9 in mounting lugs or feet 11 are drilled and spotfaced. Then the casing ports as at 12 and 13, which afford communication between interial casing compartments and the exterior, are drilled and tapped. Drill holes as at 14 receive dowel pins 15 to locate relative parts.

Side enclosures 16 and 17 are assembled parts of the casing and may be cast or made from plate stock with a welded bearing boss thereon as shown. Side enclosures 16 and 17 are interchangeable and identical except for packing gland provision 18 in 17 and bearing seal-plate 19 on 16. Aside from its orientation, bearing structure, packing gland structure, and coupling to a prime mover method, are not of the essence. In one model, I have used ball bearings to replace plain bearings 21 shown. Lubrication for the bearings may be provided by any suitable conventional method, or from the fluid pumped.

Side enclosures 16 and 17 have smooth confronting faces which fit against surfaces 6 in casing ring I. Drilled dowel holes 22 register with pins 15 in I, and screw or bolt attachment holes 23 are then drilled and/or tapped. Socket head screws, or other means, as at 24 are placed to assemble parts.

In some units, I plan to use a different casing assembly than that shown. In Fig. 9, the casing can be horizontally or vertically split or divided and confronting flanges bolted together. In this manner a casing can be assembled by manufacturing only one main casing part, for it will be clear from Fig. 9 that the casing design shown is divisible into two symmetrical and interchangeable halves if the casing is split and the side enclosures are made integral with each half of the casing ring I.

Figures 4 and 5 show one design of sector piston which can be used in the casing of Fig. 1 or Fig. 9, and designated generally at 25, comprising a shaft 26 which, in the present instance, is an integral part of 25. A sector portion 27 overhangs one end of the concentric shaft 26, and a substantially flat transverse face or faces 28 can be cut or end-milled on 27, face 28 being offset from the shaft axis by one-half the total amount of eccentricity selected to be had between the overlapping and intersecting bores 7 and 8 (Figures 1 and 9) and their corresponding relatively offset bearing centers (see center to center offset of bearings 21, Figures 1 and 9). Sector 27 has a cavity 29 cut therein which, in a good design, is one-half the sector width and its arc is concentric with shaft 26. A groove 31 may be cut in 29 to provide easy flow of fluid past the shaft of the opposite piston used in the assembly. Where face 28 meets the outside radial or peripheral surface of 27, the corners may be rounded somewhat as shown in Fig. 5.

In Figures 9 and 10, casing ring I may be cast, a core being used to form the rough interial volumetric space therein. The machining is similar to that already described for casing I in Fig. 1, but a laterally central web 32 is added in Fig. 9 and a shoulder 33 is machined in 32 simultaneously with the machining of bores 7 and 8, so as to make at least one such shoulder 33 equal in diameter to and concentric with each bore 7 and 8. Ports 12 and 13, and apertures 2 and 3, are here shown multiple and diametrically symmetrical, as are lugs 11. Plugs as at 34 are threaded into any ports 12 and 13 not immediately used for fluid passage to and/or from the rotors 25.

In Fig. 11, the sector piston rotor is designated generally at 25, and it may be cast in a mould of light-weight alloy metal. Sector portion 27 includes a transverse hole 36, and elongated recesses 42 (see also Figures 9 and 10), so as to make more uniform metal thicknesses, to reduce weight, and for purposes described later below. Volute buckets 35 are formed in sector 27 from face 28, and in the present instance buckets 35 are arcuate and offset to one side of the axis of 25 in about the proportion shown. Webs 38 and 39 are provided to join the sector portion 27 to shaft 26. The lateral sides of 27 are to be formed smooth and parallel. Alignment and counterweight ring 41 is secured to the overhung side of sector 27 in which a recess or groove or arcuate opening 37 is filled with a relatively heavy metal, as lead, at 43, and diametrically opposite 43, ring 41 is left hollow. Except for the ring 41, the piston shown in the assembly Fig. 9 and Fig. 10 is identical with the one shown in Fig. 11, or nearly so. A lubrication orifice as at 48 (Fig. 11) may be drilled thru face 28 to hole 36, and 47 is an angular or four sided hole in shaft 26 which may serve as one method of coupling the outer end of the shaft to a prime mover. Sector 27 (Figures 9, 10 and 11) may be turned and milled from round bar stock and the shaft 26 welded on to webs 38 and 39, and after normalizing, 25 may be finished to specified tolerances and chromium plated, in which instance, two sectors 27 would be made from one piece of bar stock.

In Fig. 12, 25 generally designates still another type of sector piston which may be used in the machine comprising the invention. Fig. 12 shows that two smaller sectors a and b can be mounted upon a single shaft 26; a is fixed to one end of the shaft 26 as at 44, and b turns loose on the shaft 26 where its shaft eye 45 slips over shaft 26. In an assembly using the sector piston, or pistons, shown in Fig. 12, there would be four sectors altogether. The use of four sectors offers somewhat simplified counterbalancing, if the sectors on one shaft are arranged diametrically opposite each other, and the same number of discharge impulses per unit time may be had with half the speed, but in most other respects I do not consider the design shown in Fig. 12 to be justified by the extra costs entailed with its employment. I have one working model which uses and reduces to practice the employment of four sectors as pistons, and in which the bores 7 and 8 in Fig. 9 are as wide as the piston sectors all around and the ports are located only where apertures 2 and 3 are shown. In the said model, the two sectors on each shaft are arranged diametrically opposite.

In Fig. 2, 46 represents a prime mover shaft which is coupled at the power-take-off end to one of the shafts 26 as at 47. Coupling 47 permits a limited amount of misalignment between 46 and 26, as well as a practicable amount of end play, as will be readily comprehended.

In operation, let's say, two sector pistons be movably mounted in the casing described as shown in Figures 1 and 9) on the right foreground; 25 may be made identical and interchangeable, but they are arranged opposite hand, the sector 27 on the right (Figures 1 and 9) has its shaft 26 received in the bearing 21 on the left rear (dotted lines), and the piston on the left as viewed has its shaft 29 in the bearing (not shown in Figures 1 and 9) on the right foreground; this divides the casing interial space into compartments, two in the present instance, as shown.

Only one rotational direction need be described, so let tailed arrows 50 and 51 indicate rotational direction as well as the identity of each sector piston 51 along a portion of surface 28 (Figures pling as at 47 (Fig. 2), then piston 50 engages piston 51 along a portion of surface 28 (Figures 1 and 9, upper portion of 28), and 50 pushes 51 ahead of it in the same direction. After about one-quarter revolution, the pistons move to positions shown in Fig. 6, and during this time the pistons have opened gradually between confronting faces 28 of the sector pistons 25. The volume of the right compartment is thus increased and fluid is drawn in by suction thru the right hand port 13.

After about one-half revolution the said pistons reach their maximum opening as indicated in Fig. 7, whereupon the suction is cut-off momentarily and the trapped fluid between the pistons is passed from the right compart to the left compartment, and during the time of passing there is no appreciable change in the volume of the space between the pistons. By the time further rotation begins to compress the fluid, it can escape into the left compartment of the casing and flow out to the exterior thereof thru port 12. If driven from the opposite side in either rotational direction, port 12 would be the inlet and 13 the outlet.

After about three-quarters revolution, the said trapped fluid is forced out from between the piston rotors 25 gradually, as indicated in Fig. 8, and further revolving of the rotors cause them to close gradually and return once more to the positions shown in Figures 1 and 9.

Figure 6:
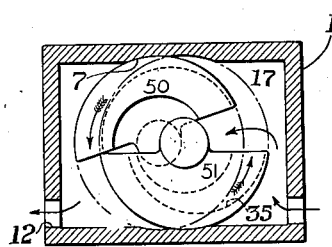
Figures 6, 7 and 8 are largely diagrammatic to illustrate operation.

Now, upon a second revolution, the action described is repeated, and in addition a change in relative piston position occurs in the right compartment causing suction thru 13 (Fig. 8) during the time the discharge occurs in the left compartment of the casing, and while intake occurs in the right compartment in Fig. 6, a displacement causing discharge occurs in the left compartment. It is found by experiment that this is the case and that two intake impulses and two discharge impulses occur per revolution of the rotors. At 300 R. P. M. there are 600 intake and 600 discharge impulses per minute or 10 of each per second. This amounts to substantially continuous flow. In operation, the pump runs smoothly and quietly, even without any counterweights described and shown in Fig. 11. However, if the mechanism is employed as a pump, and if the suction side thereof is subjected to a few feet of lift, then the rotors do not run smoothly and quietly. This is the one limitation referred to under objects of the invention listed above. Repeated tests have established that the two-sector embodiment of my invention, when employed as a pump, is not suitable where high suction lift is needed. By making certain design alterations, however, various Bourdon gages have registered as high as twenty-nine inches of vacuum suction with quiet and smooth operation. These design alterations will be disclosed in another patent application.

The operation of the machine shown in Figures 9 and 10 involves that already set forth as well as some additional features. Referring to Figures 6 to 11 inclusive, volute bucket 35 in piston 51 scoops in fluid coming down from the inlet 13 (Fig. 9) as will be seen from Fig. 6. When position Fig. 7 is reached, the momentum of the fluid causes it to be thrown over into the intake side of bucket 35 in piston 50, since the buckets register. By the time position Fig. 8 is reached the fluid's momentum, aided by centrifugal force action, causes it to be discharged up thru port 12 in Fig. 9. Note that piston 51 protrudes to the right relative to piston 50 upon intake (Fig. 6), while piston 50 similarly protrudes to the left upon discharge when position Fig. 8 is reached for the pump shown in Fig. 9. This timing arrangement of the parts avoids unnecessary loss in efficiency due to impact. Similarly, note that web 32 lies in the same plane as piston web 38. Thus, at low pressures, the pump shown in Figures 9 and 10 will pump more fluid than the actual positive displacement volume of the machine. By driving from the opposite side, the volute bucket feature will work just as well in the opposite direction and the direction of flow is also reversed.

A peculiar characteristic of the sector piston shown in Figures 4 and 5, when used in the assembly of Figures 1 or 9, is that regardless of which rotation direction the pump is driven from a given side, the flow is in one and the same direction. If driven from the opposite side in either direction, then the flow is reversed. These and other characteristics of the invention will have useful applications commercially. To enumerate all the various operational features of the invention would entail prolixity.

Additional purposes of openings 36 and 42 in the sides of the sector piston 25 (Figures 9, 10 and 11) are to provide spaces for inserting a matrix material impregnated with lubricant to aid the sealing and the lubricating of the pistons 25 and adjoining interial surfaces of the casing. This is found to be advisable when employing the invention as a gas compressor or blower.

In operating the machine, very little mechanical friction is inherent in the design. Since the sector pistons turn in the bearings 21 and the bores 7 and 8 with running fits, no appreciable pressure contact is made between the rotor elements and the casing, except in the bearings.

There is some pressure contact between the pistons where they engage each other along the outer radial surfaces of flats 28, but the place of contact is continuously changing in operation and considerable area takes the wear on portions of both pistons. Wear on surfaces 28 is automatically taken-up and it merely increases the positive displacement of the pump slightly. Energy wasted by friction has been found to be negligible, especially when pumping liquids which have lubricating properties; water will do, oil is better.

In Fig. 11, the contacting portions of transverse faces 28 function as cams and wipe over each other alternately when the machine described is operating. In cases where the invention is adapted for use as a gas compressor or blower or for any other purpose requiring lubrication, orifice 48 will function as a capillary hole to feed lubricant from hole 36 and recesses 42— where lubricant may be stored—onto the engaging portions of transverse faces 28. The rate of this feed is determined by the R. P. M. of the rotors 25, the bore diameter of orifice hole 48, and by the properties of wick material inserted in recesses 42, hole 36 and orifice 48.

The apertures as at 2 and 3 in Figures 1, 2, and 9, may be omitted where the running clearances between the sector piston periferies and the casing bore butment seats as at 7 and 8 are equal to about six one-thousandths of one inch or more. When closer clearances are used—as in a compressor or a vacuum pump—apertures 2 and 3 serve to relieve any small amount of fluid which might become trapped between the said sector pistons and the said casing seats.

Normally, the peripheries of the sector pistons 25 do not touch the arcuate bore surfaces 7 and 8, but if the bearings are neglected, or if the pump is subjected to shock, the edges of the sector pistons might score the edges of the sealing butment seats of bores 7 and 8 in Fig. 1. In Fig. 9, however, the web 32 and its bore surface 33 serves to keep the pistons in alignment so as not to seriously damage the machine. Ring 41 in Fig. 11 can be used for a similar purpose, the casing bores merely being made somewhat wider so as to accommodate the ring 41 and sector portion 27.

At speeds up to about 1,000 or more R. P. M., counterbalancing the sector pistons 25 has not been found to be essential. When one sector piston was run in the casing by itself, considerable vibration was found at speeds over 300 R. P. M., however, when both sector pistons were operated up to 1,000 R. P. M., no appreciable vibration was noticeable, especially when the machine was pumping liquids, as water or oil. This is due to the fact that one sector piston reacts upon the other to produce very nearly uniform angular momentum. Moreover, the engagement contact between the sector pistons, together with the pressure stresses transmitted thru the fluid itself, tend to tie the two opposite shafts together so as to transmit pressure stresses equally to both bearings. In fact, I have already employed the mechanism shown as a coupling means for misaligned shafts.

Fig. 9 shows to advantage that a plurality of casing ports are used, and in the present instance, the lower ports 12 and 13 are closed by plugs 34. If the pressure in the casing rises to a value beyond that for which the casing is designed, then the pressure forces out plugs 34 instead of bursting the casing, for plugs 34 are to be made of softer metal than the casing and the size and number of threads are predetermined, so the excess pressure strips the threads on plugs 34 to protect the casing. Plugs 34 cost but a few cents each, and a new one is inserted before operation is resumed. By arranging connections such that two inlets and one outlet are used, then the pump will pump and mix two fluids and discharge the mixture thru one outlet.

In an instance where it is desired to pump at a constant pressure, then the plugs 34 are removed (see Fig. 9) and any suitable conventional pressure regulator or control means is connected in place of the plugs. In this manner, if the pressure should rise above a predetermined value, fluid can be by-passed from the discharge compartment back into the intake compartment so as to keep the pressure constant. This scheme has definite advantages, for should the pressure control means require repairs or cleaning, then it is not necessary to dismantle any part of the pump proper; the defective one can be disconnected and a good one interposed between the ports 12 and 13. The defective one can then be taken to a more suitable place for repairs and tests.

When the casing shown in Fig. 9 is made of the horizontally or vertically split type, previously mentioned, and when the sector pistons 25 are made identical (as they usually are), then by using two of the casing part and two of the sector piston part, it will be clear that a mechanism comprising the invention can be assembled from the manufacture of only two main parts. The remaining parts (bolts, packing, bushings, etc.) are incidental and may be purchased separately. In this manner I expect to exploit the mechanism.

Having described my invention, and in order to bring out more clearly its basic novel features and the principle or essence by which it works, it may be stated that everything—including variable volume chamber machines—depends for its action broadly upon a condition of unbalanced force, that is, potential difference between relative forces in relation to time and space. Now, the unbalanced force is brought about in my invention by what I call the opposed, or the reverse, offset method; this results in what appears to be a new kind of machine.

There are old machines with dual eccentric bores and corresponding offset bearings in which rotary machine elements are mounted. For example, in a spur gear and in a sector gear pump; but the offset relative to the parts does not have the opposed or reverse relationship found in my invention. In my invention, it is as tho one moved the axes of a gear pump together and thru each other until they became offset in the reverse order, with the rotors revolving in one and the same direction instead of in opposite directions. Thus, in Figures 1 and 9, the sector piston or machine element 25 on the right as viewed at the neutral position has its bearing axis on the left, and the rotary element on the left has its bearing center on the right. By this simple deliberate crossing of the rotative element with respect to their bearing centers in the housing, I am able to effect a whole new series of mechanical results. This is the basic novelty of my invention which I claim.

It would entail too much prolixity to illustrate and enumerate all the new results and applications of my invention. However, a few examples may be given. I have found that just before the elements as at 25, in Figures 1 and 9, come to the neutral closed position, a great pressure is exerted thru the last few degrees of rotational distance. This can be applied to gripping-tools, chucks, clamps, etc.; to shearing operations; to crushing stone, ore, or other material, to mention a few. The opening and closing effect of the rotors can be applied to clutches, brakes, or the like; and to locking devices. The invention is also applicable to rotary valves; or to excavating or cutting machines if the volute buckets are included as shovels.

A considerable number of variable volume chamber pumps and motors of the rotary type are already made and sold. They ordinarily comprise a rotor mounted in a casing with some form of slidable element—such as a vane, a piston, a swinging "bucket," or the like—for actuating the fluid. All these have a common inherent defect, namely, the fluid actuating element has to slide while the working pressure is on the pump or motor, resulting in friction loss and wear to the parts. For this reason they are not suitable for pumping water, the liquid most commonly required to be pumped.

In my present invention, no sliding pressure contact exists between the rotor and casing, except, of course, in the main shaft bearings which exist for that very purpose—an ideal condition. The gear pump no longer enjoys this exclusive feature. The slight wear which occurs on the rotor cam areas, in my invention, is automatically taken-up without appreciable detriment to the operation or the efficiency; and the points of contact are continuously changing position, they are lubricated by the pumpage, and the slight wear involved is distributed over comparatively large areas on both cam surfaces.

As to stresses in my rotor design, no rupture has ever occurred in any molel built to handle liquids at moderate pressures, even tho a motor capable of driving the pump has been loaded to a stall, and even tho cast iron was the rotor material subjected to the torsional shear.

Development engineering work has indicated that perhaps the most useful application of the two-sector bucket type in positive displacement pumping is for pumping liquids containing solids, for it is found that anything which will pass thru proper size piping will not clog the pump itself or do serious harm to the relatively large sealing areas within a reasonable time. This has established the invention as being useful, and of value in the pumping field.

In view of these results attained, two other important features of my invention should be taken into account and disclosed. Firstly, referring to Figures 6 and 8, it will be seen that at the times the pump or motor is doing its work on the pumpage, or receives energy from the fluid handled as the case might be, large adjacent segmental areas between the rotary sector elements and the casing butment seats, as at 7 and 8, afford effective surface tension surfaces for the pumpage to serve as a liquid seal so as to prevent appreciable communication between the inlet and outlet compartments. Secondly, the rotors present large lateral areas to the casing interial walls, as at 17. As to the narrower contact area between the rotary sector pistons themselves, the cam area surfaces are in compression stress and very little leakage occurs for low lifts and moderate pressures.

While the two-sector form of variable volume chamber machine, as in Figures 1 and 9, is capable of serving as a high pressure force pump, I do not recommend the two-sector form where high pressures are wanted. Where high pressures are wanted, along with continuous smoother flow, I resort to my four-sector form of the invention. The four-sector form possesses dynamic and hydraulic balance, and can be operated at much higher speeds. The four-sector form is also superior in applications where steam is compressed in steam turbines of the multistage bleeder type, or where high pressure gas, as air or methane, is compressed and pumped, and also in applications where power is generated from internal combustion.

Since an internal combustion engine works thru part of its operation as a pump cycle, and thru the remainder as a motor, the adaptation of the invention herein set forth to serve as an internal combustion engine will be readily appreciated. In this application I desire to claim the mechanism broadly and generically, and in future applications I shall claim various embodiments, refinements and adaptations in the narrower sense.

I claim:

1. A sector piston of the character described, a shaft, a sector mounted on said shaft, a volute bucket cavity in said sector open at a transverse face not the peripheral arc of said sector, the radial depth of said volute bucket cavity relative to the axis of said shaft being greater on one side of said shaft than on the opposite side of said shaft, for the purpose described.

2. A sector piston comprising a shaft, two sectors (of less than 90° of arc each) mounted on and overhanging an end of said shaft, one of said two sectors secured to said shaft, the other of said two sectors adapted to turn loose upon said shaft, substantially as set forth.

3. In a sector piston of the character described, a shaft, a sector mounted on and overhanging an end of said shaft, a ring on the overhanging side of said sector which is concentric with said shaft and said sector, and means for counterweighting said ring on the side of said shaft diametrically opposite said sector, substantially as described.

4. In a mechanism of the character described, a casing, arcuate bores in said casing having eccentric intersection with each other, circumferentially shorter portions of said bores adjacent said intersection extending the full transverse dimension of said bores to serve substantially as butment seats, circumferentially longer portions of said bores provided with openings which communicate with multiple ports in said casing leading to the exterior thereof, and aperture branch portions of said ports communicating with said butment seats near said intersection of bores, substantially as hereinbefore disclosed.

5. Mechanism comprising a casing, arcuate bores in the casing intersecting eccentrically with each other and which form an interial chamber in said casing, bearings in said casing which open into said chamber, certain of said bearings being concentric with certain of said arcuate bores, certain other of said bearings concentric with certain other of said arcuate bores, the axes of said bearings being laterally parallel and positioned relatively close together such that the bearing contours overlap when viewed from either lateral side of said casing and come into line when viewed from either end of said casing, openings which communicate said chamber with the exterior of said casing.

6. Mechanism comprising a casing, arcuate bores in the casing intersecting eccentrically with each other and which form an interial chamber in said casing, bearings in said casing which open into said chamber, certain of said bearings being concentric with certain of said arcuate bores, certain other of said bearings concentric with certain other of said arcuate bores, the axes of said bearings being laterally parallel and positioned relatively close together such that the bearing contours overlap when viewed from either lateral side of said casing and come into line when viewed from either end of said casing, openings which communicate said chamber with the exterior of said casing, a sector piston mounted to turn around the axis of each bearing and its corresponding concentric bore, the sector pistons oriented such that their transverse faces confront each other and such that the interial volume of said casing formed by said bores and said openings is substantially divided into compartments.

7. A sector piston comprising a shaft, a concentric sector portion mounted on and overhanging an end of said shaft, the concentric outside radial perifery of said sector portion being a completely closed surface, transverse faces extending from said shaft to the periferal surface of said sector portion, said transverse faces being offset relative to the axis of said shaft in such manner that the said sector portion in lateral contour is equal to less than a semicircle, said shaft having a journaled surface on its outside diameter extending from said sector portion toward the opposite end of said shaft.

8. A sector piston comprising a shaft, a concentric sector portion mounted on and overhanging an end of said shaft, the concentric outside radial perifery of said sector portion being a completely closed surface, transverse faces extending from said shaft to the periferal surface of said sector portion, said transverse faces being offset relative to the axis of said shaft in such manner that the said sector portion in lateral contour is equal to less than a semicircle, a cavity open at said transverse faces and the lateral side of said sector portion opposite the said shaft, said cavity being concentric with said sector portion, the radial depth of said cavity from said transverse faces being greater than the radius of said shaft and less than the periferal radius of said sector portion, said shaft having a journaled surface on its outside diameter extending from said sector portion toward the opposite end of said shaft.

9. Mechanism comprising a casing, arcuate bores in the casing intersecting eccentrically with each other and which form an interial chamber in said casing, bearings in said casing which open into said chamber, certain of said bearings being concentric with certain of said arcuate bores, certain other of said bearings concentric with certain other of said arcuate bores, the axes of said bearings being laterally parallel and positioned relatively close together such that the bearing contours overlap when viewed from either lateral side of said casing and come into line when viewed from either end of said casing, openings which communicate said chamber with the exterior of said casing, a sector piston mounted to turn around the axis of each said bearing and its corresponding concentric bore, the sector pistons oriented such that their transverse faces confront each other and such that the interial volume of said casing formed by said bores and said openings is substantially divided into compartments, means to effect rotation of said sector pistons whereby the said transverse confronting faces open and close relative to each other each revolution thereof to effect the passage of fluid from one of said compartments and into another of said compartments.

10. Mechanism employing a reverse offset method, wherein complementary axially misaligned and parallel machine elements have transverse surfaces adjacently confronting each other in a neutral closed position, one of said elements disposed to the left and having its axis and bearing around which said one element can be caused to turn definitely offset to the right of and another of said machine elements disposed to the right having its axis and bearing in which said other element can be caused to turn definitely offset to the left of the median plane congruent to the said transverse surfaces, or a multiple combination of the same.

REGINALD F. MOULTON.

REFERENCES CITED

The following references are of record in the file of this patent:

UNITED STATES PATENTS

| Number | Name | Date |
|---|---|---|
| 18,986 | Palmer | Dec. 29, 1857 |
| 31,597 | Hardy et al. | Mar. 5, 1861 |
| 666,144 | Kennedy | Jan. 15, 1901 |
| 1,372,444 | Mikaelson | Mar. 22, 1921 |
| 1,445,721 | Schleppy | Feb. 20, 1923 |
| 1,640,852 | Raisig | Aug. 30, 1927 |